(12) United States Patent
Bauer et al.

(10) Patent No.: US 8,977,886 B2
(45) Date of Patent: Mar. 10, 2015

(54) METHOD AND APPARATUS FOR RAPID DISASTER RECOVERY PREPARATION IN A CLOUD NETWORK

(75) Inventors: Eric J. Bauer, Freehold, NJ (US); Randee S. Adams, Naperville, NJ (US); Daniel W. Eustace, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 332 days.

(21) Appl. No.: 13/372,630

(22) Filed: Feb. 14, 2012

(65) Prior Publication Data

US 2013/0212422 A1 Aug. 15, 2013

(51) Int. Cl.
*G06F 11/00* (2006.01)
*G06F 11/07* (2006.01)

(52) U.S. Cl.
CPC ............ *G06F 11/079* (2013.01); *G06F 11/076* (2013.01)
USPC .......................................................... 714/4.1

(58) Field of Classification Search
CPC . G06F 11/079; G06F 11/3055; G06F 11/327; G06F 11/0709; G06F 11/076
See application file for complete search history.

(56) References Cited

U.S. PATENT DOCUMENTS

| | | | |
|---|---|---|---|
| 5,870,540 A * | 2/1999 | Wang et al. ..................... 714/43 |
| 5,913,036 A | 6/1999 | Brownmiller et al. |
| 6,848,062 B1 * | 1/2005 | Desai et al. .................... 714/4.1 |
| 7,167,860 B1 * | 1/2007 | Black et al. .................... 705/35 |
| 7,580,994 B1 | 8/2009 | Fiszman et al. |
| 7,660,893 B2 * | 2/2010 | Brillhart et al. ............... 709/224 |
| 8,429,453 B2 * | 4/2013 | Ito et al. ........................... 714/25 |
| 8,429,457 B2 * | 4/2013 | Harris et al. ..................... 714/32 |
| 2006/0233310 A1 | 10/2006 | Adams, Jr. et al. |
| 2008/0102772 A1 | 5/2008 | Ghandhi |
| 2008/0144523 A1 * | 6/2008 | Nishi et al. ..................... 370/253 |
| 2008/0165685 A1 * | 7/2008 | Weiss et al. .................... 370/231 |
| 2008/0225716 A1 | 9/2008 | Lange |
| 2009/0064248 A1 * | 3/2009 | Kwan et al. .................... 725/109 |
| 2010/0094981 A1 * | 4/2010 | Cordray et al. ............... 709/222 |
| 2010/0097944 A1 | 4/2010 | Wang et al. |
| 2010/0188986 A1 * | 7/2010 | Csaszar et al. ................ 370/252 |
| 2011/0264956 A1 * | 10/2011 | Ito et al. .......................... 714/20 |

OTHER PUBLICATIONS

Eric Bauer, et al., "Beyond Redundancy: How Geographic Redundancy Can Improve Service Availability and Reliability of Computer-Based Systems," 2012, pp. 214-218, IEEE Press—John Wiley and Sons, Inc., Hoboken, New Jersey, USA.
Eric Bauer, et al., "Reliability and Availability of Cloud Computing," 2012, pp. 133-137, IEEE Press—John Wiley and Sons, Inc., Hoboken, New Jersey, USA.

(Continued)

*Primary Examiner* — Charles Ehne
(74) *Attorney, Agent, or Firm* — C. Bilicska

(57) ABSTRACT

Various embodiments provide a method and apparatus of providing a rapid disaster recovery preparation in cloud networks that proactively detects disaster events and rapidly allocates cloud resources. Rapid disaster recovery preparation may shorten the recovery time objective (RTO) by proactively growing capacity on the recovery application(s)/resource(s) before the surge of recovery traffic hits the recovery application(s)/resource(s). Furthermore, rapid disaster recovery preparation may shorten RTO by growing capacity more rapidly than during "normal operation" where the capacity is increased by modest growth after the load has exceeded a utilization threshold for a period of time.

19 Claims, 5 Drawing Sheets

(56) References Cited

OTHER PUBLICATIONS

Peter Mell, et al., "The NIST Definition of Cloud Computing—Recommendations of the National Institute of Standards and Technology," Sep. 2011, 7 pages, NIST Special Publication 800-145, Computer Security Division, Information Technology Laboratory, National Institute of Standards and Technology, U.S. Department of Commerce, Gaithersburg, MD, USA.

PCT International Search Report, dated Aug. 19, 2013 (PCT/US2013/024335) 6 pages.

* cited by examiner

METHOD AND APPARATUS FOR RAPID DISASTER RECOVERY PREPARATION IN A CLOUD NETWORK

TECHNICAL FIELD

The invention relates generally to methods and apparatus for providing disaster recovery in cloud networks.

BACKGROUND

This section introduces aspects that may be helpful in facilitating a better understanding of the inventions. Accordingly, the statements of this section are to be read in this light and are not to be understood as admissions about what is in the prior art or what is not in the prior art.

Service recovery to geographically redundant data centers may ensure business continuity following a force majeure or disaster event that renders a primary data center site unavailable for service. In some known cloud network disaster recovery schemes, cloud resources for an application are allocated based on conventional resource allocation schemes. These schemes conventionally grow and shrink allocated application resources in response to new patterns of incoming application requests resulting from the disaster event.

In some other known disaster recovery schemes, certain portions of a system may contain excess resources in order to meet projected disaster recovery resource needs.

SUMMARY

Various embodiments provide a method and apparatus of providing a rapid disaster recovery preparation in cloud networks that proactively detects disaster events and rapidly allocates cloud resources. Rapid disaster recovery preparation may shorten the recovery time objective (RTO)—the time it takes to restore user service in the recovery data center following a disaster event—by proactively growing capacity on the recovery application(s)/resource(s) before the surge of recovery traffic hits the recovery application(s)/resource(s). Furthermore, rapid disaster recovery preparation may shorten RTO by growing capacity more rapidly than during "normal operation" where the capacity is increased by modest growth after the load has exceeded a utilization threshold for a period of time. Advantageously, detecting disaster events and arranging to rapidly expand cloud network resources to the recovery site reduces the risk of network congestion, saturation, or overload without reserving excess resources, thereby, accelerating service recovery to impacted users.

In one embodiment, an apparatus is provided for providing rapid disaster recovery preparation. The apparatus includes a data storage and a processor communicatively coupled to the data storage. The processor is configured to monitor network metrics from a first network resource, determine that a disaster condition has occurred that impacts availability of a second network resource based on the received network metrics, and send a disaster warning alert message to a third network resource. Where the first, second and third network resources are different resources.

In some of the above embodiments, the monitored network metrics includes a monitored traffic flow. The monitored traffic flow includes one or more traffic flow values.

In some of the above embodiments, the determination that a disaster condition has occurred is based on a detection that the monitored traffic flow has been interrupted.

In some of the above embodiments, the determination that a disaster condition has occurred is based on a detection that the monitored traffic flow has abnormal traffic patterns.

In some of the above embodiments, the monitored network metrics comprise warning mechanism information.

In some of the above embodiments, the warning mechanism information is exogenous sensor information.

In some of the above embodiments, the determination that a disaster condition has occurred is based on a confidence level.

In some of the above embodiments, the determination that a disaster condition has occurred includes further programming the processor to determine a disaster severity level.

In some of the above embodiments, the processor is further programmed to: analyze a plurality of network resources, determine a disaster recovery recommendation based on the plurality of network resources, and select the third network resource based on the disaster recovery recommendation.

In some of the above embodiments, the processor is further programmed to select the third network resource based on the disaster recovery recommendation.

In some of the above embodiments, the processor is further programmed to create the disaster warning alert message based on the disaster recovery recommendation.

In a second embodiment, an apparatus is provided for providing rapid disaster recovery preparation. The apparatus includes a data storage and a processor communicatively coupled to the data storage. The processor is programmed to: receive a disaster warning alert message and perform a rapid elastic growth operation, the rapid elastic growth operation comprising: a growth of network resource prior to exceeding a utilization threshold.

In some of the above embodiments, the rapid elastic growth operation further comprises a growth rate that is greater than twice a normal growth rate of resource allocated when the utilization threshold is exceeded.

In some of the above embodiments, the rapid elastic growth operation further comprises a growth rate based on the received disaster warning alert message.

In some of the above embodiments, the processor is further programmed to: monitor a traffic load, determine that a disaster condition does not exist based on the monitored traffic load, and in response to the determination that the disaster condition does not exist, perform an elastic shrinkage operation, the elastic shrinkage operation releasing at least a portion of the growth of network resources.

In a third embodiment, a system is provided for providing rapid disaster recovery preparation. The system includes: at least one network resource, a plurality of data centers, and a resource monitor communicatively coupled to the at least one network resource and the plurality of data centers. The plurality of data centers includes a disaster-impacted data center and a recovery data center. The resource monitor is programmed to: receive network metrics from the at least one network resource, determine that a disaster condition has occurred that impacts availability of the disaster-impacted data center based on the received network metrics, and send a disaster warning alert message to the recovery data center. The recovery data center is programmed to: receive the disaster warning alert message and perform a rapid elastic growth operation, the rapid elastic growth operation comprising: a growth of network resource prior to exceeding a utilization threshold.

In some of the above embodiments, the rapid elastic growth operation further comprises a growth rate that is greater than twice a normal growth rate of resource allocated when the utilization threshold is exceeded.

In some of the above embodiments, the rapid elastic growth operation further comprises a growth rate based on the received disaster warning alert message.

In a fourth embodiment, a method is provided for providing rapid disaster recovery preparation. The method includes: receiving network metrics from a first network resource, determining that a disaster condition has occurred that impacts availability of a second network resource based on the received network metrics, and sending a disaster warning alert message to a third network resource. Where the first, second and third network resources are different resources.

In some of the above embodiments, the received network metrics comprise a monitored traffic flow, the monitored traffic flow comprising one or more traffic flow values.

In some of the above embodiments, the step of determining that a disaster condition has occurred is based on detecting that the monitored traffic flow has been interrupted.

In some of the above embodiments, the step of determining that a disaster condition has occurred is based on a confidence level.

In some of the above embodiments, the method further includes: receiving the disaster warning alert message and performing a rapid elastic growth operation, the rapid elastic growth operation comprising: growing network resource prior to exceeding a utilization threshold.

BRIEF DESCRIPTION OF THE DRAWINGS

Various embodiments are illustrated in the accompanying drawings, in which.

To facilitate understanding, identical reference numerals have been used to designate elements having substantially the same or similar structure or substantially the same or similar function.

DETAILED DESCRIPTION OF ILLUSTRATIVE EMBODIMENTS

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated. Also, the various embodiments described herein are not necessarily mutually exclusive, as some embodiments can be combined with one or more other embodiments to form new embodiments.

Various embodiments provide a method and apparatus of providing a rapid disaster recovery preparation in cloud networks that proactively detects disaster events and rapidly allocates cloud resources. Rapid disaster recovery preparation may shorten the RTO by proactively growing capacity on the recovery application(s)/resource(s) before the surge of recovery traffic hits the recovery application(s)/resource(s). Furthermore, rapid disaster recovery preparation may shorten RTO by growing capacity more rapidly than during "normal operation" where the capacity is increased by modest growth after the load has exceeded a utilization threshold for a period of time.

Figure 1:
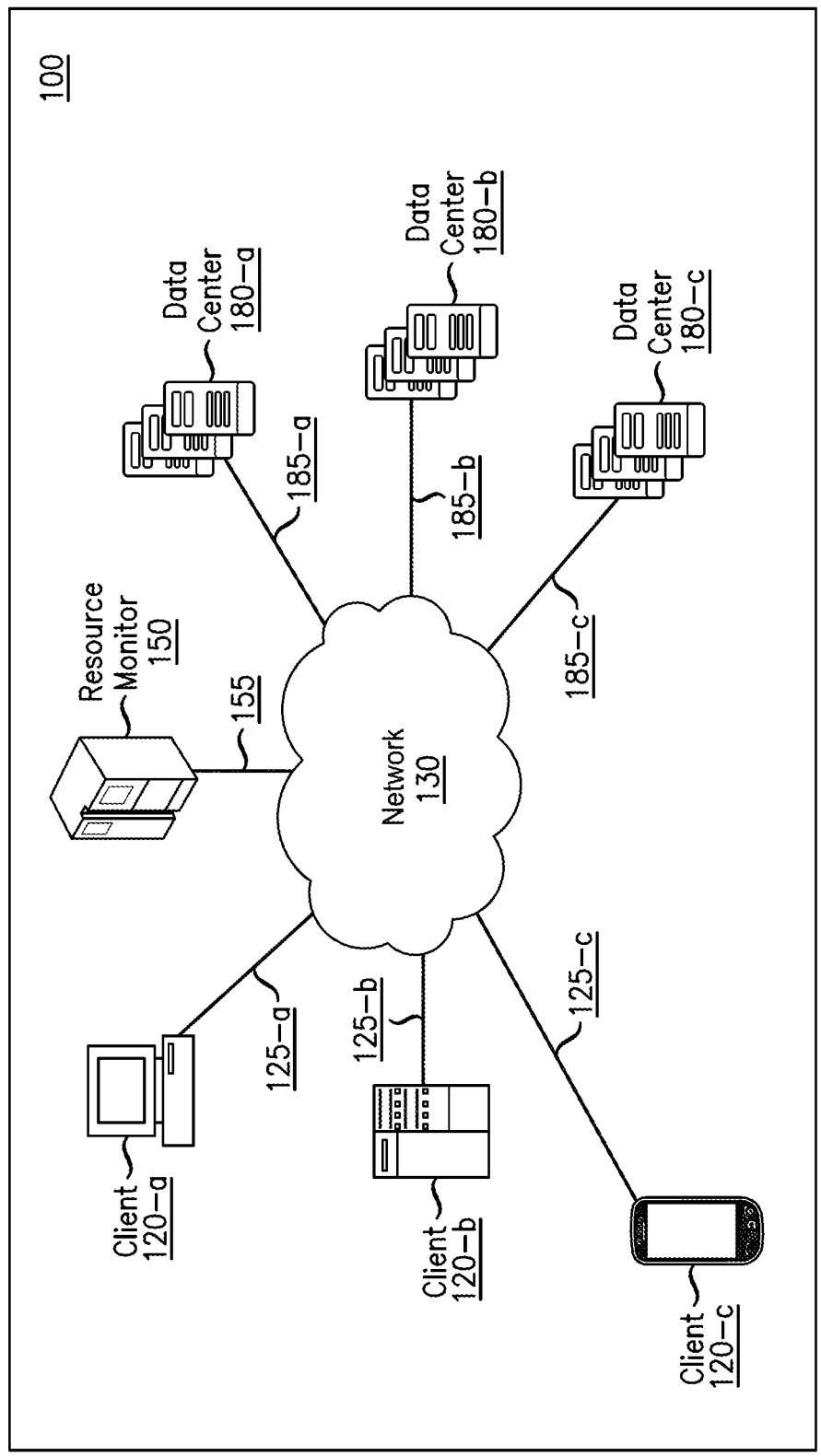
FIG. 1 illustrates a cloud network that includes an embodiment of the rapid disaster recovery preparation architecture 110.

FIG. 1 illustrates a cloud network 100 that includes an embodiment of the rapid disaster recovery preparation architecture. The cloud network 100 includes one or more clients 120-*a*-120-*c* (collectively, clients 120) that send application requests to applications in the data centers 180-*a*-180-*c* (collectively, data centers 180) via a communication path. The communication path may include one of client communication channels 125-*a*, 125-*b*, and 125-*c* (collectively client communication channels 125), a network 130, and one of data center communications channels 185-*a*, 185-*b*, and 185-*c* (collectively, data center communication channels 185). The cloud network 100 also includes a resource monitor 150 that monitors cloud network resources and sends disaster warning alert message(s) over a resource monitor communication channel 155.

The term "cloud network resource" as used herein should be understood broadly as including any allocated resource. For example, a cloud network resource may include equipment (e.g., routers and wireless basestations) or facilities (e.g., optical fibers and coaxial cables).

The clients 120 may be any type or number of client machine(s) initiating application request(s) directed to one of the application instances instantiated on data centers 180. For example, a client may be: a server, a mobile phone, a tablet, a computer, a personal digital assistant (PDA), an e-reader, a network device (e.g., a switch or a router) or the like.

The communication channels 125 and 185 may support retrieving or responding to application requests over one or more communication channels such as: wireless communications (e.g., LTE, GSM, CDMA, bluetooth); femtocell communications (e.g., WiFi); packet network communications (e.g., IP); broadband communications (e.g., DOCSIS and DSL); storage communications (e.g., Fibre Channel, iSCSI) and the like. It should be appreciated that though depicted as a single connection, communication channels 125 and 185 may be any number or combinations of communication channels supporting communication between clients 120 and the application instances instantiated on data centers 180.

The network 130 may be any suitable network(s) for facilitating communication between clients 120 and the application instances instantiated on data centers 180. For example, network 130 may be any combination of: Local Area Network(s) (LAN), Wireless Local Area Network(s) (WLAN), Wide Area Network (WAN), Metropolitan Area Network (MAN), or the like.

The resource monitor 150 monitors cloud network resources or warning mechanisms. In particular, when resource monitor 150 detects a condition(s) indicative of a disaster affecting a data center (e.g., data center 180-*a*), resource monitor 150 sends disaster warning alert message(s) to the recovery application(s)/resource(s) (e.g., an application instance instantiated on data center 180-*b* or a router in network 130). It should be appreciated that although resource monitor 150 is depicted outside of network 130, resource monitor 150 may reside within network 130.

The resource monitor communication channel 155 may support receiving or transmitting messages to clients 120, resources of network 130 (not shown), or applications in data centers 180 over one or more communication channels such as: wireless communications (e.g., LTE, GSM, CDMA, bluetooth); femtocell communications (e.g., WiFi); packet network communications (e.g., IP); broadband communications (e.g., DOCSIS and DSL); storage communications (e.g., Fibre Channel, iSCSI) and the like. It should be appreciated that though depicted as a single connection, resource monitor communication channel 155 may be any number or combinations of communication channels supporting communication between resource monitor 150 and clients 120, resources of network 130 (not shown), or applications in data centers 180.

The data centers 180 are geographically distributed and may include any configuration. The data centers 180 contain the resources which comprise the virtual machines running applications created to service application requests from clients 120. In particular, at least one application in data centers 180 is configured to receive the disaster warning alert message(s) from resource monitor 150. In response to a received disaster warning alert message, data centers 180 proactively allocate recovery application(s)/resource(s) to accelerate service recovery of impacted clients 120.

It should be appreciated that by proactively and rapidly allocating recovery application(s)/resource(s), the elastic surge in capacity is online before the bulk of the clients 120 needing to recover have initiated recovery action(s). For example, a disaster event may cause a large number of clients 120 to attempt to recover to the recovery site (e.g., connect, logon and be authenticated, and establish sessions) in a brief window, which can overload the recovery data center. Thus, the rapidly increasing load can be served efficiently without triggering overload with congestion controls (which may decrease customer service quality).

In some embodiments of resource monitor 150, a condition indicative of a disaster (i.e., a disaster condition) may include a dramatic change in traffics flow, abnormal traffic patterns or an explicit alarm/failure indication such as a loss-of-signal indicator. In a further embodiment, the resource monitor 150 will determine that there is a disaster condition after receiving a threshold number of loss-of-signal indicators. It should be appreciated that several loss-of-signal indicators may indicate a breakage of a transport medium such as optical fibers.

In some embodiments of resource monitor 150; warning mechanisms may include exogenous sensors or inputs from a monitored data feed. In some of these embodiments, the exogenous sensor is a seismograph monitor. In some of these embodiments, the monitored data feed is an internet connection to a national/international tsunami or other disaster warning mechanisms.

In some embodiments, data centers 180 may include resources such as processors/CPU cores, network interfaces, memory devices or data storage devices. Moreover, data centers 180 may be any suitable physical hardware configuration such as: one or more server(s), blades consisting of components such as processor, memory, network interfaces or storage devices. In some of these embodiments, the data center may include cloud network resources that are remote from each other. It should be appreciated that by allocating resources such as processors, network interfaces, memory devices or data storage, a data center may scale the processing, bandwidth, RAM and persistent storage capabilities of an application instance or virtual machine.

Figure 2:
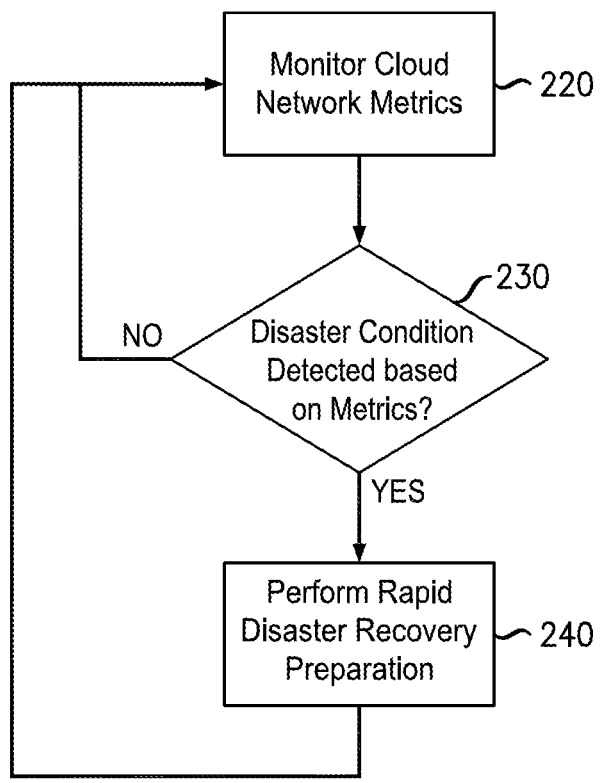
FIG. 2 depicts a flow chart illustrating an embodiment of a method 200 for providing rapid disaster recovery preparation in cloud networks.

FIG. 2 depicts a flow chart illustrating an embodiment of a method 200 for providing rapid disaster recovery preparation in cloud networks.

In the method 200, the step 220 includes monitoring cloud network metrics from a cloud network resource (e.g., by resources of the network 130 of FIG. 1 (not shown) or applications in data centers 180 of FIG. 1) or warning mechanisms. Cloud network metrics may be any suitable metric that may be used to determine the existence of a disaster condition or to determine network conditions to facilitate recovering from a disaster condition. For example, cloud network metrics may include: traffic flow values, loading/capacity values, network provisioning, health messages (e.g., heart beat messages), network alarms (e.g., multiple fiber cuts), exogenous alarms, data feeds or the like.

In the method 200, the step 230 includes detecting a disaster condition based on the cloud network metrics (e.g., by the resource monitor 150 of FIG. 1). In particular, the cloud network metrics are analyzed to determine whether the characteristics of the collected cloud network metrics indicate that a disaster condition has occurred. If a disaster condition has occurred, the apparatus executing the method send a disaster warning alert message to the recovery application(s)/resource(s) and proceeds to step 240, else the apparatus returns to step 220. It should be appreciated that the detection of a disaster condition does not require that an actual disaster has or will occur. Rather, the disaster condition detection merely indicates that the monitored cloud network metrics indicate that a disaster may have occurred. Advantageously, by sending a disaster warning alert message prior to an absolute confirmation of a disaster, an increased time interval may be afforded to the recovery application(s)/resource(s) to complete recovery preparations prior to the potential surge of recovery traffic.

In the method 200, the step 240 includes performing rapid disaster recovery preparation (e.g., by resources of the network 130 of FIG. 1 (not shown) or application instances executing on data centers 180 of FIG. 1). In particular, the recovery application(s)/resource(s) receives the disaster warning alert message and proactively (re)allocates cloud network resources in order to handle the anticipated surge of recovery traffic that is anticipated to be diverted from the disaster-impacted application(s)/resource(s).

In some embodiments, the step 220 is performed by the resource monitor 150 of FIG. 1.

Figure 3:
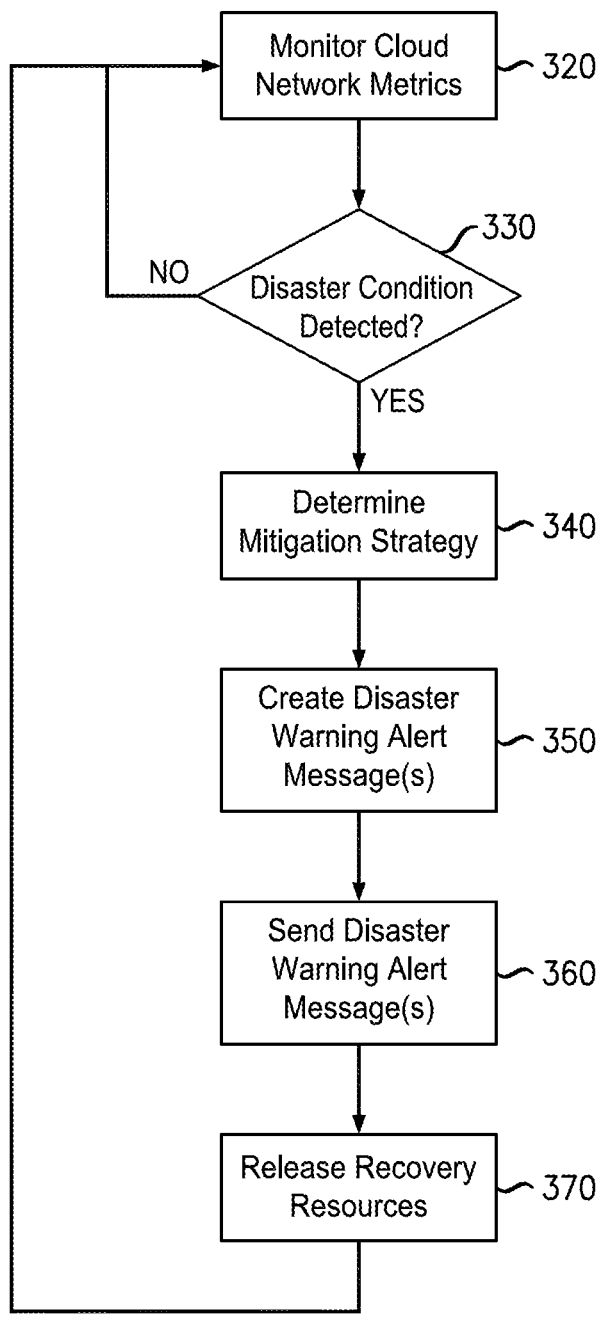
FIG. 3 depicts a flow chart illustrating an embodiment of a method 300 for a resource monitor (e.g., resource monitor 150 of FIG. 1) to detect a disaster based on cloud network metrics as illustrated in step 230 of FIG. 2.

FIG. 3 depicts a flow chart illustrating an embodiment of a method 300 for a resource monitor (e.g., resource monitor 150 of FIG. 1) to detect a disaster based on cloud network metrics as illustrated in step 230 of FIG. 2. The method includes monitoring cloud network metrics (step 320), such as captured during step 220 in FIG. 2. The apparatus performing the method then determines whether the received cloud network metrics are indicative of a disaster event (step 330) and if so, optionally determines a mitigation strategy (step 340), and creates (step 350) and sends one or more disaster warning alert message(s) (step 360) to recovery application(s)/resource(s) such as described in step 240 of FIG. 2 and FIG. 4.

In the method 300, the step 320 includes monitoring one or more cloud network metrics (e.g., over resource monitor communication channel 155 or directly from resource monitor 150) from one or more sources. In some embodiments, the resource monitor may select or provision the cloud network metrics to be monitored. For example, the resource monitor may monitor traffic flow(s) to or from one or more of data centers (e.g., data centers 180 of FIG. 1).

In the method 300, the step 330 includes detecting a disaster based on the received cloud metrics. In particular, the cloud network metrics are analyzed to determine whether the characteristics of the collected cloud network metrics indicate that a disaster condition has occurred.

The method 300 optionally includes step 340. Step 340 includes determining a mitigation strategy. In particular, the resource monitor may have knowledge of network provisioning, status, performance, or impairments of cloud network resources (e.g., network 130 or applications in data centers 180 of FIG. 1). Based on this knowledge, the resource manager may make a disaster recovery recommendation.

In the method 300, the step 350 includes creating a disaster warning alert message. In particular, the message contains an indicator that a disaster condition has been detected or provides recovery provisioning information.

In the method 300, the step 360 includes sending one or more disaster warning alert message(s) to recovery application(s)/resource(s). In particular, one or more of the disaster warning alert message(s) will be directed to the recovery application(s)/resource(s) that the apparatus performing the method determines will use the disaster warning alert message(s) to perform rapid disaster recovery preparation as described in step 240 of FIG. 2 and FIG. 4.

The method 300 optionally includes step 370. Step 370 includes sending a disaster release message. In particular, after the disaster warning or event expires, the recovery application(s)/resource(s) are sent a message to release the recovery cloud network resources that were reserved to address the potential disaster.

In some embodiments, the step 320 includes the resource monitor (e.g., resource monitor 150 of FIG. 1) gathering the cloud network metrics from itself. For example, if the resource monitor is positioned as a router/IP networking connection in the network between a carrier's network and a data center.

In some embodiments, the step 320 includes monitoring IP networking connections from a resource within a network (e.g., a router in a carrier's network (not shown) that is a part of network 130 of FIG. 1) to a data center (e.g., data center 180-*b* of FIG. 1). In some of these embodiments, the step 330 includes detecting that the monitored data center might be experiencing a disaster when the flow of IP traffic immediately drops or access connections to the data center fail or are cut. It should be appreciated that any traffic flow, not just an IP traffic flow, may be monitored.

In some embodiments, the step 330 includes, aggregating more than one cloud network metric to determine whether a disaster condition exists.

In some embodiments, the step 330 includes, determining that a disaster condition exists based upon a "confidence level" that a disaster occurred. In some of these embodiments, the confidence level may be aggressive. For example, the determination of a disaster condition may be triggered when the "confidence level" of an actual disaster is less than or equal to fifty percent (50%). It should be appreciated that a service provider may be more concerned with false negatives (i.e., not proactively preparing for an actual disaster) than with false positives (i.e., preparing for a disaster that never occurs).

In a first embodiment of the step 330, rule-based modeling is used to detect whether the cloud network metrics received in step 320 are indicative of a disaster event. For example, if the traffic level of a monitored traffic flow falls to or below a traffic threshold over a duration threshold (e.g., the traffic flow drops to 0 for one minute), then a disaster is detected.

In a second embodiment of the step 330, a conventional predictive analysis program is used to detect whether the cloud network metrics received in step 320 are indicative of a disaster event. For example, monitored traffic flows may be inputted into a conventional predictive analysis program. Such predictive analysis program may then classify the inputted traffic flow patterns against stored training traffic flow patterns to make a determination of whether a disaster has been detected. In some of these embodiments, the predictive analysis program may be trained to make a disaster detection classification based on a confidence level.

In some embodiments, the step 340 includes determining a mitigation strategy based on the network status/performance/impairment information. In some of these embodiments, the determination of a mitigation strategy includes one or more of the following:

1) deducing which data center(s)/application instance(s) are likely to be affected (e.g., an earthquake in San Jose is likely to impact data centers in the silicon valley area);
2) determining the recovery application(s)/resource(s) to which to direct the disaster warning alert message(s) (e.g., a router in network 130 or an application in data center 180-*b* of FIG. 1);
3) determining the recovery preparations, such as surging recovery resources or recovery policies, to make at the determined recovery application(s)/resource(s) to prepare to efficiently recover service of impacted users (e.g., changing a QoS policy at the router in network 130 or surging resources in applications in data center 180-*b* in FIG. 1).

In some embodiments, the step 340 includes establishing a plurality of disaster severity levels. In some of these embodiments, the disaster severity level is based on the confidence level of the disaster condition. In some of these embodiments, the disaster severity level is based on the potential impact of the disaster. For example, a cut fiber may only impact one data center while an earthquake or tsunami may impact an entire region including multiple data centers. It should be appreciated that responses to a disaster impacting one data center as compared to multiple data centers may differ. For example, different QoS policies may be applied or resources may be allocated to emergency services before non-essential consumer services. In some of these embodiments, the disaster warning alert message will be based on the disaster severity level.

In some embodiments, the step 340 includes establishing a plurality of disaster responses to a corresponding plurality of disaster severity levels. For example, if disaster severity levels of red, yellow and green are established, the recommendations for the QoS policy to apply or the amount of resources to reserve for each disaster level may be different.

In some embodiments, the step 340 includes determining geographic information for the recovery application(s)/resource(s) and further basing the mitigation strategy on the geographic information. For example, if it is determined that a threshold of disaster-impacted data centers have been detected in a geographic area, the resource monitor may select a recovery data center that is outside of the impacted geographic area.

In some embodiments of step 340, the mitigation strategy includes determining the distribution of the recovery load to the recovery application(s)/resource(s). For example, the load from a disaster-impacted data center (e.g., data center 180-*a* of FIG. 1) will be distributed and load balanced to recovery data centers (e.g., data center 180-*a* and 180-*b* of FIG. 1).

In some embodiments, the step 340 includes exchanging messages with one or more cloud network resources (e.g., one or more of applications of data centers 180 of FIG. 1 or one or more resources of network 130 (not shown)). For example, a resource monitor (e.g., resource monitor 150 of FIG. 1) may send a message to an application on a potential recovery data center (e.g., data center 180-*b*) either recommending resource capacity(s) or requesting whether the recovery data center can handle specified resource capacity(s) included in the message request. In these embodiments, the mitigation strategy recommendation may be based on this message exchange.

In some embodiments, the step 340 includes autonomously redirecting traffic (e.g., autonomously change DNS to shift traffic away from a disaster-impacted data center to a recovery data center).

In some embodiments, the step 340 includes gathering requirements of the application(s) running on the disaster-impacted data center. In particular, the requirements of the application and the topology of the various resources of the application including information such as how many virtual machines are present, how they are connected, the data access pattern of the application or the service requirements of the application may be gathered. For example, if the resource monitor 150 has knowledge of the resources of data center 180-*a* being used just prior to the detection of the disaster, resource monitor 150 may create and pass a recovery recommendation (e.g., an expected load value) to the recovery data center (e.g., 180-*b*) based on at least a subset of those requirements.

In some embodiments of the step 340, a recovery recommendation for one or more of the recovery application(s)/resource(s) may be determined. In a further embodiment of these embodiments, the disaster warning alert message includes the disaster recovery recommendation.

In some embodiments of step 340, the recovery recommendation may include: a resource allocation recommendation, a resource requirement or recovery parameters (e.g., an expected load or an RTO requirement).

In some embodiments, the step 350 includes incorporating information based on the network status/performance/impairment/recommendation information or the application requirements from step 340 in one or more of the disaster warning alert message(s).

In some embodiments, the step 370 includes determining that the disaster warning or event expires based on subsequently received cloud network metrics. For example, if the disaster warning was determined based on a monitored traffic flow from a data center (e.g., data center 180-*a*) being dropped, the disaster warning may be expired if subsequently received cloud network metrics indicate that the monitored traffic flow has been restored.

In some embodiments, the step 370 includes determining that the disaster warning or event expires based on a time threshold. For example, if an actual disaster has not been recorded within thirty (30) minutes, then the system may expire the disaster warning.

In a further embodiment, the step 370 may include modifying the disaster condition determination of step 330. For example, if the system repeatedly sends disaster warnings based on a monitored traffic flow being dropped at 11:30 PM, but the disaster warnings always expire at 12:00 PM when traffic resumes, step 330 may be modified in an attempt to alleviate those false positives. In another example, if the disaster warning expires based on the expiration of a time threshold, step 330 may be modified to include more stringent determination characteristics so as not to trigger another alarm quickly after the disaster warning expiration.

In the step 350, it should be appreciated that basing the creation of a disaster warning alert message on information from any of the other method steps may include inclusion of the information in any form and does not require a "copying" of the information in the disaster warning alert message.

Figure 4:
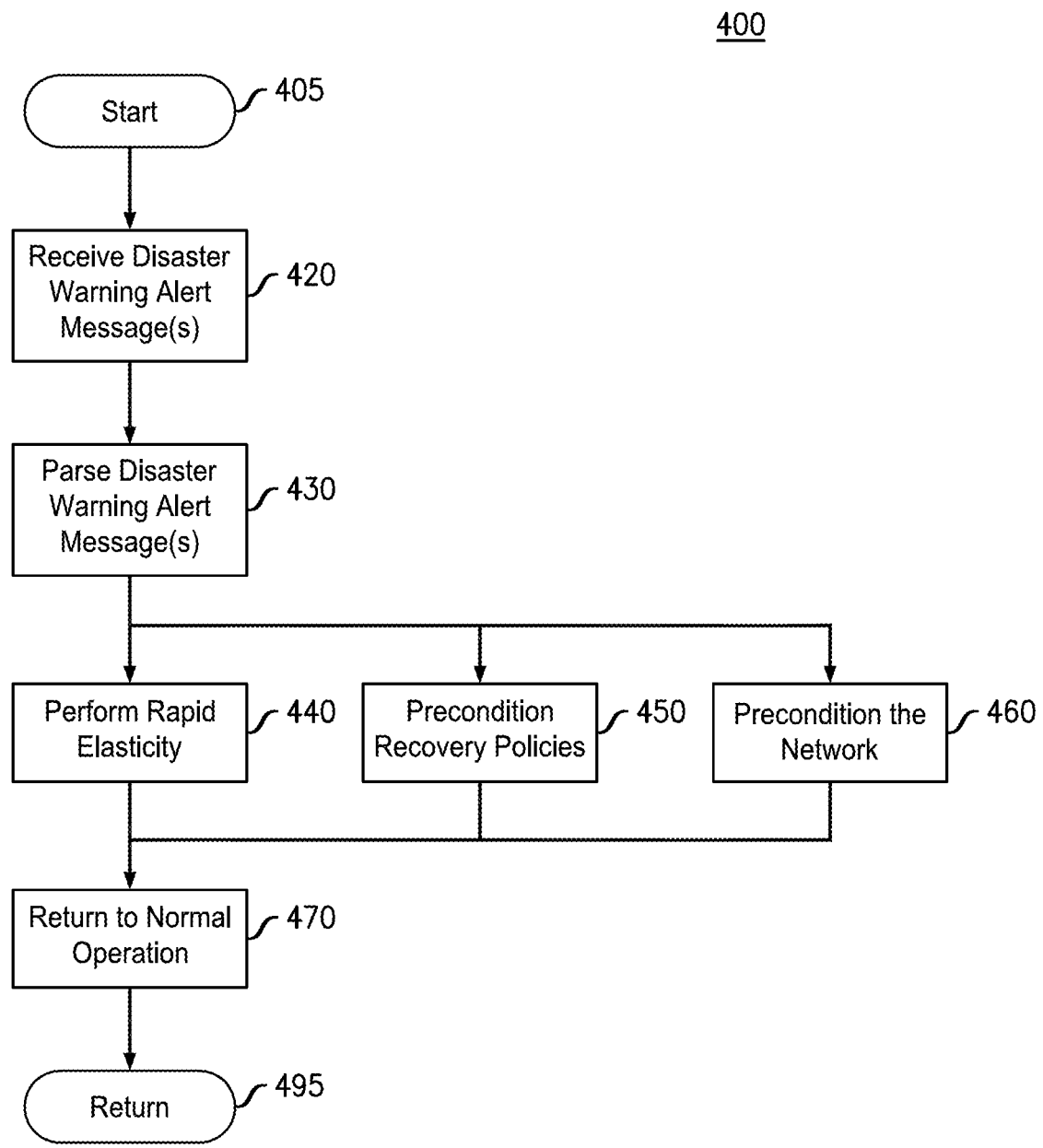
FIG. 4 depicts a flow chart illustrating an embodiment of a method 400 for a recovery resource (e.g., an application in data centers 180 of FIG. 1 or a resource in network 130) to perform a rapid disaster recovery preparation as illustrated in step 240 of FIGS. 2.

FIG. 4 depicts a flow chart illustrating an embodiment of a method 400 for a recovery resource (e.g., an application in data centers 180 of FIG. 1 or a resource in network 130) to perform a rapid disaster recovery preparation as illustrated in step 240 of FIG. 2. The method includes receiving one or more disaster warning alert message(s) (step 420), such as sent during step 360 in FIG. 3. The apparatus performing the method then parses the received disaster warning alert messages (step 430) and then: (i) performs rapid elasticity (step 440); (ii) preconditions operational recovery policies (step 450); or (iii) precondition the network (step 460). Finally, the method includes returning the apparatus to normal operation (step 470).

In the method 400, the step 420 includes receiving one or more disaster warning alert message(s) (e.g., over data center communication channels 185, over a communication channel in network 130 (not shown) or directly from itself).

In the method 400, the step 430 includes parsing the received disaster warning alert message(s). In particular, the disaster warning alert message is parsed to determine which, if any, of steps 440, 450, or 460 should be performed. It should be appreciated that an apparatus may only perform one step (e.g., step 440) and the disaster warning alert message may simply be a disaster warning indicator.

The method 400 optionally includes step 440. Step 440 includes performing rapid elasticity. In particular, the apparatus performing the method initiates rapid elastic growth based on the receipt of the disaster warning alert message even if the apparatus has not yet detected a congestion condition. Rapid elastic growth is distinct from normal elastic growth. In normal elastic growth, capacity is grown at a steady state after the load has exceeded a utilization threshold for a period of time. In rapid elastic growth, capacity is increased in preparation for a surge of predicted traffic (i.e., not based on a determination that load has exceeded a utilization threshold).

The method 400 optionally includes step 450. Step 450 includes preconditioning recovery policies. In particular, the apparatus performing the method may modify its operating policies for one or more of its cloud network resources based on the receipt of the disaster warning alert message. Modifying operating policies may include: (i) configuring quality of service parameters; (ii) deferring low priority/offline tasks; or (iii) the like.

The method 400 optionally includes step 460. Step 460 includes preconditioning the network. In particular, the apparatus performing the method may reconfigure traffic flows, increase bandwidth the recovery application(s)/resource(s) or the like.

The method 400 optionally includes step 470. Step 470 includes returning the apparatus to a normal mode of operation. In particular, the preparations taken in one or more of steps 440, 450 and 460 may be "rolled back".

In some embodiments, the step 440 includes massive elastic growth. Massive elastic growth is the growth of recovery cloud network resources by a factor greater than 2 as compared to normal growth. In some of these embodiments, the massive elastic growth is 10 times larger than the normal growth.

In some embodiments, the step 440 initiates an elastic growth operation based on a stored value. For example, a stored value may dictate that an application on the recovery data center increase capacity by 100% or more for elements in the recovery critical path such as authentication servers.

In a further embodiment, a plurality of values may be stored based on dynamic information such as, time or day, day of the week, and the like.

In some embodiments, the step 440 includes initiating an elastic growth operation based on information available to the apparatus. In particular, the apparatus may assign sufficient resources/initiate sufficient application instances to meet one or more of the individual application's expected load or RTO requirements. For example, if the information specifies a 15 minute RTO for an application, the authentication database on the recovery apparatus hosting the user credentials may base the elastic growth operation on the ability to validate credentials for every user (e.g., clients 120 in FIG. 1) in a time frame less than 15 minutes. It should be appreciated that the elastic growth operation may grow capacity more aggressively than is required for normal operation in order to accommodate the surge in user authentication requests to the recovery data center following a disaster event.

In some embodiments, the step 440 includes initiating an elastic growth operation based on information contained in the disaster warning alert message(s). The disaster warning alert message(s) may contain any suitable information to base an elastic growth operation upon such as: (i) the expected load that will be experienced; (ii) an RTO requirement; (iii) a QoS policy; (iv) a network configuration; or (v) the like. Expected load may include any suitable information to base an elastic growth operation upon such as: a load, resource requirements, number of impacted users or any other relevant secondary information such as the size of the data center that was impacted. For example, if the disaster alert warning message contains information on the size of the disaster-impacted data center, the application in the recovery data center (e.g., data center 180-*b* of FIG. 1) may grow the resources by fifty percent (50%) for a small disaster-impacted data center and one hundred percent (100%) for a large disaster-impacted data center.

In some embodiments, the step 440 includes imitating a "just right" elastic growth operation. A "just right" elastic growth operation surges the capacity to approximately the expected instantaneous traffic growth. For example, if the disaster warning alert message contains an estimation of the load that will transferred, the apparatus performing the method may surge capacity sufficient to handle the predicted load. In some of these embodiments, an application may surge capacity above the predicted load to provide a buffer zone. In some embodiments, the safety zone may be less or equal to ten percent (10%).

In some embodiments, the step 450 includes modifying operational policies. In some of these embodiments, the apparatus performing the method may defer low priority or offline tasks. In some of these embodiments the apparatus performing the method may modify QoS to make more resource available to serve impacted users.

In some embodiments, the step 450 includes setting an adaptive bit rate (e.g., using HTTP adaptive bitrate streaming) based on information contained in the disaster warning alert message(s). For example, a recovery resource such as a video delivery appliance may be sent a disaster warning alert message with information recommending that the bitrate for videos be reduced for a certain time duration. Such a reduction in video bandwidth may enable the system to handle the surge in traffic (e.g., authentication traffic) immediately following the disaster.

In some embodiments, the step 450 includes setting QoS traffic management policies. In one further embodiment, a recovery resource such as a router may be sent a disaster warning alert message with information recommending the queuing policy be set to a strict priority queue for a duration of time. For example, to help facilitate the delivery of high priority packets or real-time packets—at the expense of starving other packet types. In a second further embodiment, a recovery resource such as a router may be sent a disaster warning alert message with information recommending that certain types of packets (e.g., video) be dropped. In a third further embodiment, a recovery application such as an application in a data center may be sent a disaster warning alert message with information recommending that backup policies be eased for a duration of time to ease processing overhead or an immediate backup be forced (e.g., if the resource monitor has determined that the data center is in at risk area, a backup to a remote location may be forced to protect the integrity of the data store).

In some embodiments, the step 470 includes rolling back if a traffic spike does not occur during an interval of time. In some embodiments, the roll back interval may be less than or equal to 30 minutes. In some of these embodiments, the roll back interval is based on how the infrastructure-as-a-service is billed. For example, a service provider may be billed hourly for the amount of resources they are using for their applications. In this example, a service provider may set the roll back interval in hourly increments.

In some embodiments, the step 470 includes rolling back if the apparatus receives a subsequent "all clear". For example, a resource monitor (e.g., resource monitor 150 of FIG. 10) may determine that the disaster condition has expired due to the condition being a false positive or the disaster having passed. In this embodiment, the resource monitor may send a subsequent message to the apparatus informing the apparatus that the disaster condition has expired.

Although primarily depicted and described in a particular sequence, it should be appreciated that the steps shown in methods 200, 300 and 400 may be performed in any suitable sequence. Moreover, the steps identified by one step may also be performed in one or more other steps in the sequence or common actions of more than one step may be performed only once.

It should be appreciated that steps of various above-described methods can be performed by programmed computers. Herein, some embodiments are also intended to cover program storage devices, e.g., data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable data storage media. The embodiments are also intended to cover computers programmed to perform said steps of the above-described methods.

Figure 5:
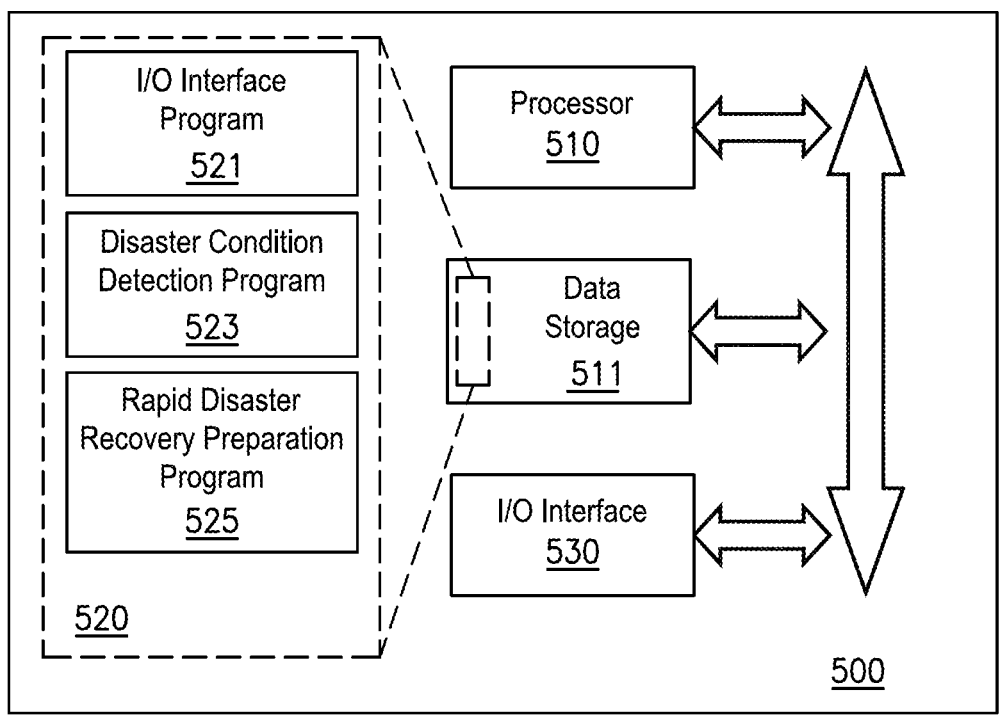
FIG. 5 schematically illustrates an embodiment of various apparatus 500 such as resource monitor 150 of FIG. 1, a virtual machine of one of data centers 180 or one of the resources of network 130 of FIG. 1.

FIG. 5 schematically illustrates an embodiment of various apparatus 500 such as resource monitor 150 of FIG. 1, a virtual machine of one of data centers 180 or one of the resources of network 130 of FIG. 1. The apparatus 500 includes a processor 510, a data storage 511, and an I/O interface 530.

The processor 510 controls the operation of the apparatus 500. The processor 510 cooperates with the data storage 511.

The data storage 511 may store program data such as cloud network metrics (e.g., from step 320 of FIG. 3), gathered cloud network resource characteristics (e.g., from step 340 of FIG. 3), QoS requirements (e.g., from step 450 of FIG. 4), or fresh data (e.g., from step 460 of FIG. 4) as appropriate. The data storage 511 also stores programs 520 executable by the processor 510.

The processor-executable programs 520 may include an I/O interface program 521, a disaster condition detection program 523, or a rapid disaster recovery preparation program 525. Processor 510 cooperates with processor-executable programs 520.

The I/O interface 530 cooperates with processor 510 and I/O interface program 521 to support communications over communications channels 125, 155 or 185 of FIG. 1 as described above (e.g., in monitoring cloud network metrics in step 320 of FIG. 3, sending disaster warning alert message(s) in step 360 of FIG. 3 and receiving disaster warning alert message(s) in step 420 of FIG. 4).

The disaster condition detection program 523 performs the step 230 of FIG. 2 and the steps of the method 300 of FIG. 3 as described above.

The rapid disaster recovery preparation program 525 performs the step 240 of FIG. 2 and the steps of the method 400 of FIG. 4 as described above.

In some embodiments, the apparatus 500 may be virtual machine. In some of these embodiments, the virtual machine may include components from different machines or be geographically dispersed. For example, the data storage 511 and the processor 510 may be in two different physical machines.

When processor-executable programs 520 are implemented on a processor 510, the program code segments combine with the processor to provide a unique device that operates analogously to specific logic circuits.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively coupled to any suitable arrangement of devices; storing information in any suitable combination of memory(s), storage(s) or internal or external database(s); or using any suitable number of accessible external memories, storages or databases. As such, the term data storage referred to herein is meant to encompass all suitable combinations of memory(s), storage(s), and database(s).

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated that any block diagrams herein represent conceptual views of illustrative circuitry embodying the principles of the invention. Similarly, it should be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus for providing rapid disaster recovery preparation, the apparatus comprising:
   a data storage; and
   a processor communicatively coupled to the data storage, the processor being configured to:
   monitor network metrics from a first network resource;
   determine that a disaster condition has occurred that impacts availability of a second network resource based on the received network metrics; and
   send a disaster warning alert message to a third network resource;
   wherein the first, second and third network resources are different resources; and
   wherein the monitored network metrics comprise exogenous sensor information.

2. The apparatus of claim 1, wherein the monitored network metrics comprise a monitored traffic flow, the monitored traffic flow comprising one or more traffic flow values.

3. The apparatus of claim 2, wherein the determination that a disaster condition has occurred is based on a detection that the monitored traffic flow has been interrupted.

4. The apparatus of claim 2, wherein the determination that a disaster condition has occurred is based on a detection that the monitored traffic flow has abnormal traffic patterns.

5. The apparatus of claim 1, wherein the determination that a disaster condition has occurred is based on a confidence level.

6. The apparatus of claim 1, wherein the determination that a disaster condition has occurred comprises further configuring the processor to:
   determine a disaster severity level.

7. The apparatus of claim 1, wherein the processor is further configured to:
   analyze a plurality of network resources;
   determine a disaster recovery recommendation based on the plurality of network resources; and
   select the third network resource based on the disaster recovery recommendation.

8. The apparatus of claim 7, wherein the processor is further configured to:

select the third network resource based on the disaster recovery recommendation.

9. The apparatus of claim 7, wherein the processor is further configured to:
create the disaster warning alert message based on the disaster recovery recommendation.

10. An apparatus for providing rapid disaster recovery preparation, the apparatus comprising:
a data storage; and
a processor communicatively coupled to the data storage, the processor being configured to:
receive a disaster warning alert message; and
perform a rapid elastic growth operation, the rapid elastic growth operation comprising: a growth of network resource prior to exceeding a utilization threshold;
wherein the rapid elastic growth operation further comprises a growth rate that is greater than twice a normal growth rate of resource allocated when the utilization threshold is exceeded.

11. The apparatus of claim 10, wherein the rapid elastic growth operation further comprises a growth rate based on the received disaster warning alert message.

12. The apparatus of claim 10, wherein the processor is further configured to:
monitor a traffic load;
determine that a disaster condition does not exist based on the monitored traffic load; and
in response to the determination that the disaster condition does not exist, perform an elastic shrinkage operation, the elastic shrinkage operation releasing at least a portion of the growth of network resources.

13. A recovery system for providing rapid disaster recovery preparation, the system comprising:
at least one network resource;
a plurality of data centers, the plurality of data centers comprising a disaster-impacted data center and a recovery data center;
a resource monitor apparatus communicatively coupled to the at least one network resource and the plurality of data centers, the resource monitor apparatus being configured to:
receive network metrics from the at least one network resource;
determine that a disaster condition has occurred that potentially impacts availability of the disaster-impacted data center, the determination being based on the received network metrics; and
send a disaster warning alert message to the recovery data center; and
the recovery data center being configured to:
receive the disaster warning alert message; and
perform a rapid elastic growth operation, the rapid elastic growth operation comprising: a growth of network resource prior to exceeding a utilization threshold;
wherein the rapid elastic growth operation further comprises a growth rate that is greater than twice a normal growth rate of resource allocated when the utilization threshold is exceeded.

14. The system of claim 13, wherein the rapid elastic growth operation further comprises a growth rate based on the received disaster warning alert message.

15. A method for rapid disaster recovery preparation, the method comprising:
at a processor communicatively coupled to a data storage, receiving network metrics from a first network resource;
determining, by the processor in cooperation with the data storage, that a disaster condition has occurred that impacts availability of a second network resource based on the received network metrics; and
sending, by the processor in cooperation with the data storage, a disaster warning alert message to a third network resource;
wherein the first, second and third network resources are different resources; and
wherein the network metrics comprise exogenous sensor information.

16. The method of claim 15, wherein the received network metrics comprise a monitored traffic flow, the monitored traffic flow comprising one or more traffic flow values.

17. The method of claim 15, wherein the step of determining that a disaster condition has occurred is based on detecting that the monitored traffic flow has been interrupted.

18. The method of claim 15, wherein the step of determining that a disaster condition has occurred is based on a confidence level.

19. The method of claim 15 further comprising:
receiving, by the third network resource, the disaster warning alert message; and
performing, by the third network resource, a rapid elastic growth operation, the rapid elastic growth operation comprising: growing network resource prior to exceeding a utilization threshold.

* * * * *